United States Patent
Cho et al.

(10) Patent No.: US 9,100,098 B2
(45) Date of Patent: Aug. 4, 2015

(54) MOBILE TERMINAL

(75) Inventors: Sang Chul Cho, Seoul (KR); Jang Won Lee, Seoul (KR)

(73) Assignee: BLUEBIRD SOFT CO., LTD. (KR)

( * ) Notice: Subject to any disclaimer, the term of this patent is extended or adjusted under 35 U.S.C. 154(b) by 857 days.

(21) Appl. No.: 13/383,414

(22) PCT Filed: Jul. 14, 2010

(86) PCT No.: PCT/KR2010/004587
§ 371 (c)(1),
(2), (4) Date: Jan. 10, 2012

(87) PCT Pub. No.: WO2011/008026
PCT Pub. Date: Jan. 20, 2011

(65) Prior Publication Data
US 2012/0113012 A1    May 10, 2012

(30) Foreign Application Priority Data

Jul. 14, 2009 (KR) .......... 10-2009-0064226
Jul. 14, 2010 (KR) .......... 10-2010-0067928

(51) Int. Cl.
*H04B 1/3888* (2015.01)
*H04M 1/02* (2006.01)
*H04M 1/18* (2006.01)
*H04M 1/23* (2006.01)

(52) U.S. Cl.
CPC ........... *H04B 1/3888* (2013.01); *H04M 1/0277* (2013.01); *H04M 1/18* (2013.01); *H04M 1/236* (2013.01)

(58) Field of Classification Search
CPC .................................................. H04M 1/0266
See application file for complete search history.

(56) References Cited

U.S. PATENT DOCUMENTS

| | | | |
|---|---|---|---|
| 5,251,329 A | 10/1993 | Takagi et al. | |
| 5,313,663 A | 5/1994 | Norris | |
| 5,905,632 A | 5/1999 | Seto et al. | |
| 7,656,675 B2 * | 2/2010 | Kim et al. ............. | 361/752 |
| 2003/0119545 A1 | 6/2003 | Hosoi | |
| 2005/0140778 A1 | 6/2005 | Kim et al. | |

(Continued)

FOREIGN PATENT DOCUMENTS

| | | |
|---|---|---|
| KR | 10-2006-0004868 | 1/2006 |
| KR | 10-2008-0021928 | 3/2008 |

(Continued)

OTHER PUBLICATIONS

Office Action for U.S. Appl. No. 14/620,175, mailed May 8, 2015.

*Primary Examiner* — Gerald Johnson

(57) ABSTRACT

Disclosed is a mobile terminal. The mobile terminal of the present invention comprises: a front case having a keypad-accommodating portion; a rear case attachably/detachably coupled to a rear surface of the front case; an intermediate case which is interposed between the front case and the rear case and assembled to the front case and the rear case, and at one side of which a main PCB is assembled; a keypad having a plurality of key buttons and made of a flexible material, accommodated in the keypad-accommodating portion of the front case; and a touch screen arranged on the front case in the vicinity of the keypad. As the mobile terminal of the present invention has both the keypad and the touch screen, operating convenience is improved in terms of storage, maintenance and information management as compared to conventional mobile terminals.

21 Claims, 12 Drawing Sheets

(56) References Cited

U.S. PATENT DOCUMENTS

2009/0058361 A1 3/2009 John
2010/0277377 A1 11/2010 Sato et al.

FOREIGN PATENT DOCUMENTS

KR 10-2008-0065397 7/2008
KR 10-2009-0072347 7/2009

* cited by examiner

MOBILE TERMINAL

TECHNICAL FIELD

The present invention relates to a mobile terminal, and more particularly to a mobile terminal which has both a keypad and a touch screen, so that operating convenience is improved in terms of storage, maintenance, management, etc. for information as compared to conventional mobile terminals.

BACKGROUND ART

A mobile terminal is a terminal freely usable while moving without regard to places. As a representative mobile terminal, there is a cellular phone or the like mobile communication terminal, a personal digital assistant (PDA), etc. Therefore, the term 'mobile terminal' involves the PDA, the cellular phone, etc., but the following descriptions will be limited to the PDA for the convenience of explanation.

In complicated and diversified society, individuals each have felt the need to store and keep personal information in his/her own ways, and thus various products have been launched in the market so as to meet the personal needs. One of them is the PDA. The PDA is also called a pocket computer, which is a generic term for palm-sized small devices having calculation, information storage and searching functions for personal or business use. Occasionally, it has been mostly used in maintaining information about a schedule calendar, an address book, etc.

In particular, an industrial PDA has currently been mainly used in the distribution industry, but its market has been gradually spread. The industrial PDA refers to a PDA having various office functions, such as a barcode scanner, a credit card machine, etc. not present in a general PDA. If the industrial PDA is used, it is advantageous to efficiently progress delivery, data management, related business, etc. For example, an insurance broker of an insurance company can directly process various insurance-related tasks such as customer information management, customer searching, scheduling, a daily record of consultation, memorial day searching, funds statement processing, etc. on the spot through the PDA; a medical worker of a hospital can input or search X-ray image and graphic data as well as medical records and history of a patient, and a prescription through the industrial PDA without being constrained by time and places; and a traffic or patrol cop of the police can perform a crackdown outside of the office through the industrial PDA so that a fine levied for violation of the traffic regulations, the payment of which is currently possible after a lapse of 2 or 3 days from the crackdown, can be directly paid to banking facilities, and it is thus possible for the traffic or patrol cop to remarkably reduce a time taken in the crackdown outside of the office.

As used in various industrial fields, the industrial PDA is required to meet conditions above a predetermined level to endure an industrial environment other than a general environment unlike a general PDA. For example, it is absolutely predictable that the industrial PDA may be used in a refrigerated warehouse at 10 or less degrees below zero or may be used outdoors for a long time, unlike the general PDA. Further, the industrial PDA has to have shock resistance, water-resistant property, heat-resisting property/cooling function, etc. above a predetermined level to raise competiveness as a product since a postman or the like user may carelessly handle it on business. Thus, it is essential that the industrial PDA has to not only be stronger and harder than the general PDA but also have the water-resistant property to keep out rain and snow. However, the outer appearance of the industrial PDA is considerably larger than that of the general PDA since it is designed to have a structure for satisfying the foregoing conditions such as shock resistance, water-resistant property, heat-resisting property/cooling function, etc. above a predetermined level and has to be mounted with a barcode scanner or the like as described above. Therefore, it is needed to reduce the size of the PDA so as to be conveniently used by Asians who have a smaller hand than Westerners.

Meanwhile, among conventional mobile terminals, the industrial PDA has been classified into a keypad type PDA having a keypad provided with a plurality of key buttons to display information on a display window through operation of the key buttons, and a touch-screen type PDA touch, and there is still no PDA having both the keypad and the touch screen to improve operating convenience.

Accordingly, if the industrial PDA having both the keypad and the touch screen is developed, it will be expected that operating convenience is more improved than that of conventional mobile terminals and application and use thereof are expanded in light of storage, maintenance, management, etc. for information as compared to.

DISCLOSURE OF INVENTION

Technical Problem

The present inventive concept provides a mobile terminal which has both a keypad and a touch screen, so that operating convenience is improved in terms of storage, maintenance, management, etc. for information as compared to conventional mobile terminals.

Advantageous Effects

According to the present inventive concept, there is provided a mobile terminal which has both a keypad and a touch screen, so that operating convenience is improved in terms of storage, maintenance and management for information as compared to conventional mobile terminals.

BEST MODE FOR CARRYING OUT THE INVENTION

Figure 1:
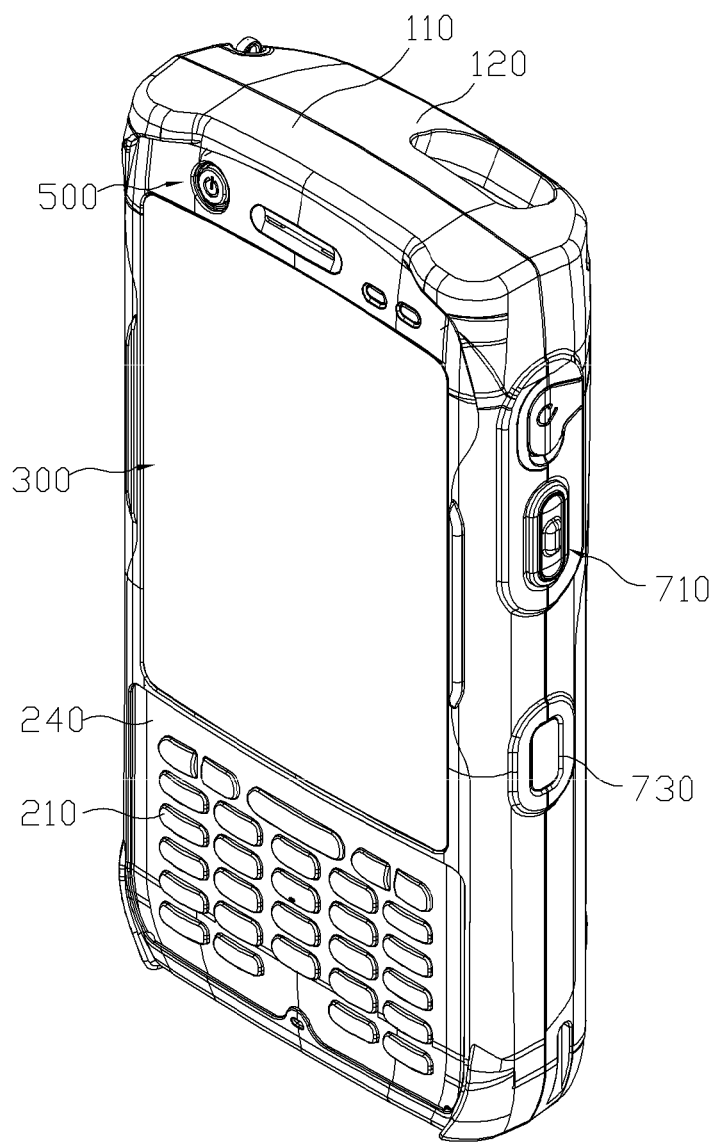
FIG. 1 is a perspective view of a mobile terminal according to an exemplary embodiment of the present inventive concept.

According to an aspect of the present inventive concept, there is provided a mobile terminal including: a front case having a keypad-accommodating portion; a rear case detachably coupled to the front case at a rear surface of the front case; an intermediate case interposed between the front case and the rear case and assembled to the front case and the rear case, and at one side of which a main printed circuit board (PCB) is assembled; a keypad having a plurality of key buttons and made of a flexible material, accommodated in the keypad-accommodating portion of the front case; and a touch screen arranged on the front case in the vicinity of the keypad.

The touch screen may include a resistive overlay touch screen.

The touch screen may include: an upper electrode including a polyethylene terephthalate (PET) film with indium tin oxide (ITO); a lower electrode including a glass substrate with ITO and a dot spacer formed toward the upper electrode; and a wiring connecting the upper electrode and the lower electrode and electrically connected to the main PCB.

The upper electrode and the lower electrode may be partially accommodated and supported in an electrode-accommodating portion formed on a surface of the intermediate case, and the touch screen may include tempered glass coupled to the front surface of the front case; and a water-resistant tape attached to the rear of the front case.

An edge portion of the keypad may be provided with a water-resistant blade extending toward the keypad-accommodating portion, and on a bottom of the keypad-accommodating portion may be formed a blade-insertion rail in which the water-resistant blade is partially inserted.

The blade-insertion rail may be formed by an outer wall of the keypad-accommodating portion and a protrusion rib protruding from the bottom at a position spaced apart from the outer wall.

A plurality of protrusions may protrude from the outer wall of the keypad-accommodating portion toward a center area of the keypad-accommodating portion, and on the edge portion of the keypad may be formed a groove to be arranged corresponding to and be fit with the protrusion.

The mobile terminal may further include a keypad PCB smaller than the keypad is inserted in the keypad, wherein the front case formed with the keypad-accommodating portion is formed with a through hole through which a flexible printed circuit board (PCB) passes so that the main PCB and the keypad PCB can be electrically connected to each other.

The mobile terminal may further include a keypad cover coupled to the keypad-accommodating portion in front of the keypad so that the key buttons can be exposed to the outside, wherein the keypad cover includes a keypad protective cover placed on the keypad and coupled to the keypad-accommodating portion; and a keypad decorative cover coupled to the top of the keypad protective cover.

The mobile terminal may further include: a power key unit coupled to one side of the main PCB and turning on/off the operation of the main PCB; and a reset key unit coupled to the other side of the main PCB and initializing a memory.

The power key unit may include a power-key tact switch provided at one side of the main PCB; a first switch shield provided in the intermediate case and passing the power-key tact switch therethrough while supporting and surrounding the power-key tact switch; a flexible power-key water-resistant cap inserted in the first switch shield, airtightly sealing the first switch shield, and having a first protrusion shielding end portion adjacent to the power-key tact switch; and a power key inserted in and coupled to the power-key water-resistant cap and substantially pressing the power-key tact switch.

The power key may include a first shaft to be inserted in an insertion portion of the power-key water-resistant cap; a first head formed at an exposed end portion of the first shaft; and a first flange provided between the first shaft and the first head, more expanded outward in a radial direction than the diameter of the first head, and serving to cover an entrance of the insertion portion stepped from the outer wall of the power-key water-resistant cap toward the first protrusion shielding end portion.

One of the first shaft and the insertion portion may be formed with a direction setting key block, and the other one is formed with a key groove to which the direction setting key block is coupled.

The reset key unit may include a reset-key tact switch provided at the other side of the main PCB; a second switch shield provided in the main PCB to surround the reset-key tact switch and passing the reset-key tact switch therethrough; a flexible reset-key water-resistant cap inserted in the second switch shield, airtightly sealing the second switch shield, and having a second protrusion shielding end portion adjacent to the reset-key tact switch; and a reset key inserted in and coupled to the reset-key water-resistant cap and substantially pressing the reset-key tact switch.

The reset key may include a second shaft to be inserted in an insertion portion of the reset-key water-resistant cap; a second head formed at an exposed end portion of the second shaft; and a second flange provided between the second shaft and the second head, more expanded outward in a radial direction than the diameter of the second head, and serving to cover an entrance of the insertion portion stepped from the outer wall of the reset-key water-resistant cap toward the second protrusion shielding end portion.

The mobile terminal may further include: a water-resistant rubber airtightly sealing up the front and rear cases between the front and rear cases, and integrated with side keys.

The side keys may be symmetrically provided in opposite sides of the water-resistant rubber while forming a pair, and the pair of side keys may be partially exposed to the outside of the front and rear cases when the front and rear cases are assembled, the side key including: a key protrusion protruding from the outer surface of the water-resistant rubber; and a key rod connected to the key protrusion, extended to the inside of the front and rear cases and contacting the main PCB, and the side key being made of the same material as the water-resistant rubber.

The side key may further include a plate member to be coupled to the rear of the key protrusion as being put on the key rod.

The mobile terminal may further include a display window coupling portion, to which a display window is coupled, being formed at one side of the water-resistant rubber; and a boundary rib additionally protruding to form a boundary between the front and rear cases on the inner and outer surfaces of the water-resistant rubber.

A barcode reader module may be coupled to at least one of the front case and the rear case and mounted to the main PCB.

The mobile terminal may further include an information-recognition speaker connected to the barcode reader module and generating an operation signal for the barcode reader module.

The mobile terminal may include an industrial personal digital assistant.

MODE FOR INVENTION

The attached drawings for illustrating preferred embodiments of the present invention are referred to in order to gain a sufficient understanding of the present invention, the merits thereof, and the objectives accomplished by the implementation of the present inventive concept.

Hereinafter, the present inventive concept will be described in detail by explaining preferred embodiments of the invention with reference to the attached drawings. However, descriptions about publicly known functions or configurations will be omitted for clarity.

A mobile terminal is a terminal freely usable while moving without regard to places. As a representative mobile terminal, there is a cellular phone or the like mobile communication terminal, a personal digital assistant (PDA), etc. Therefore, the term 'mobile terminal' involves the PDA, the cellular phone, etc., but the following descriptions will be limited to the PDA for the convenience of explanation.

Figure 2:
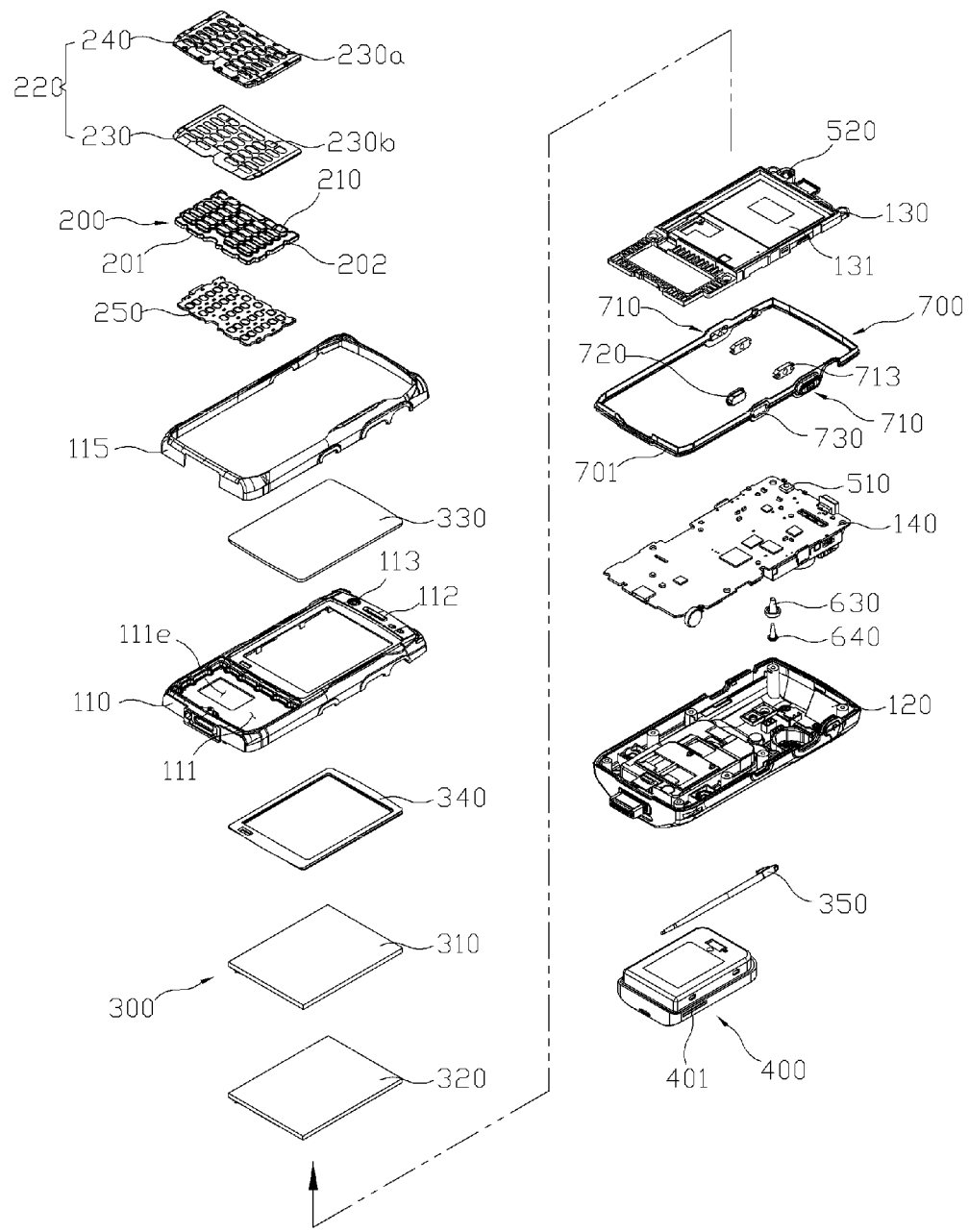
FIG. 2 is an exploded perspective view of the mobile terminal of FIG. 1.
Figure 3:
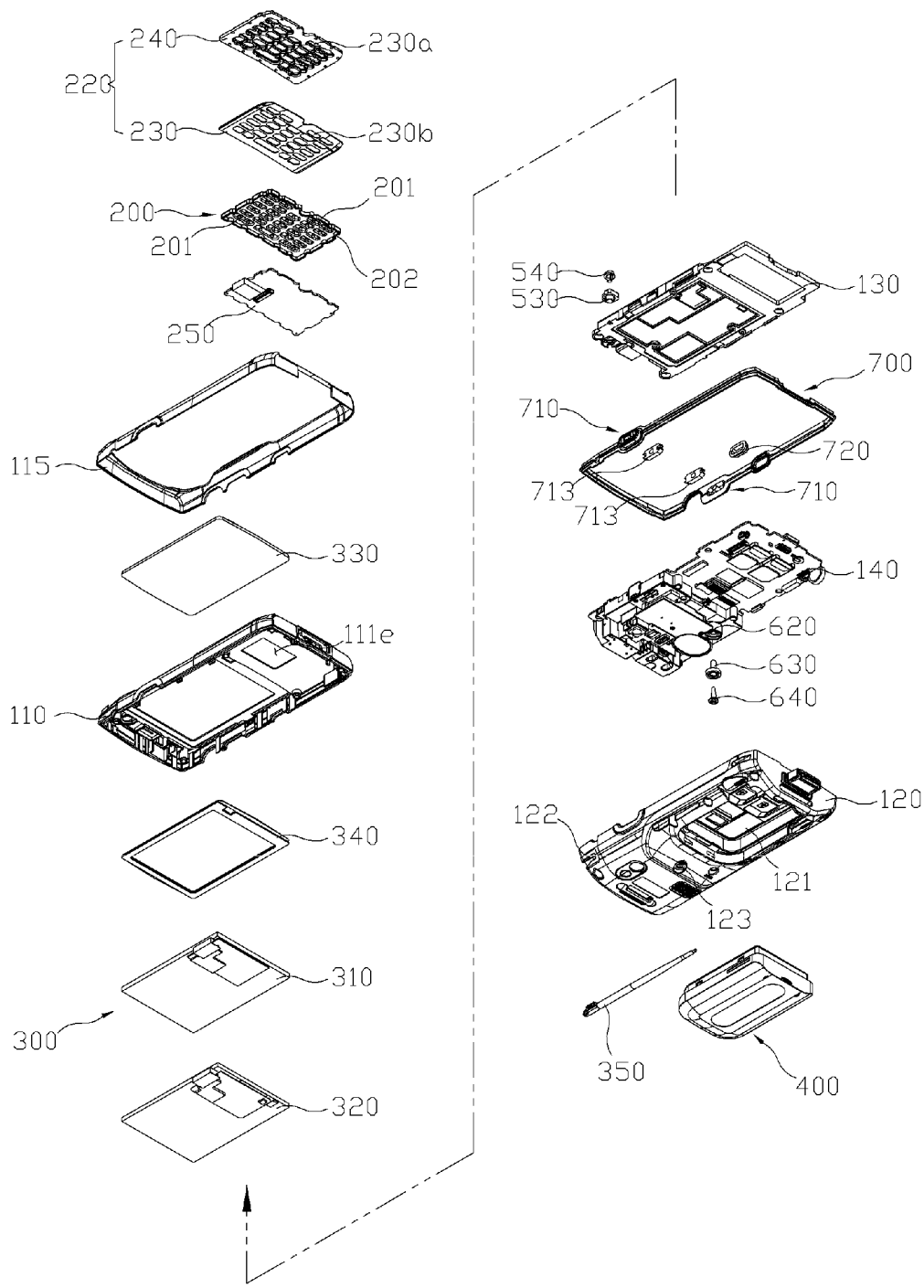
FIG. 3 shows FIG. 1 at a different angle.
Figure 4:
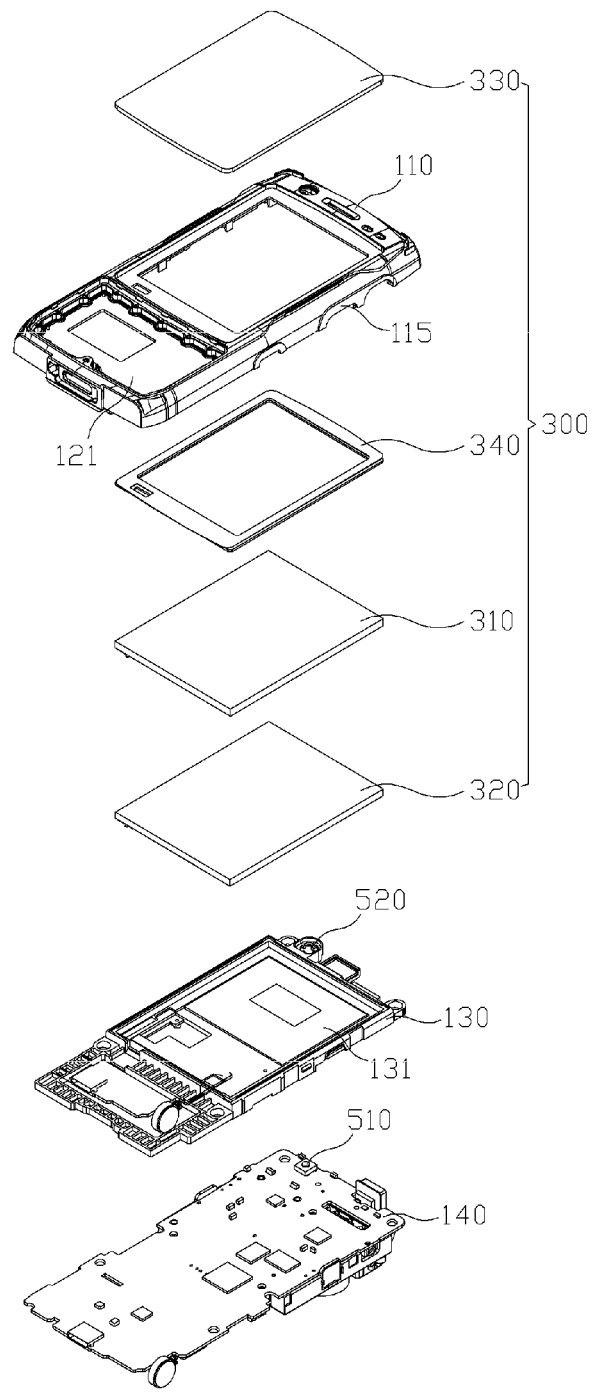
FIG. 4 is an exploded perspective view of a touch screen area.
Figure 5:
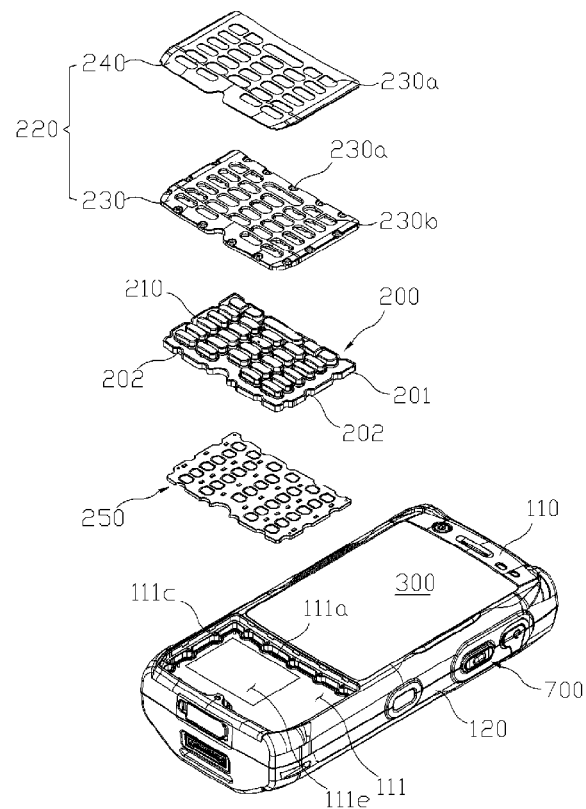
FIG. 5 is an exploded perspective view of a key pad area.
Figure 6:
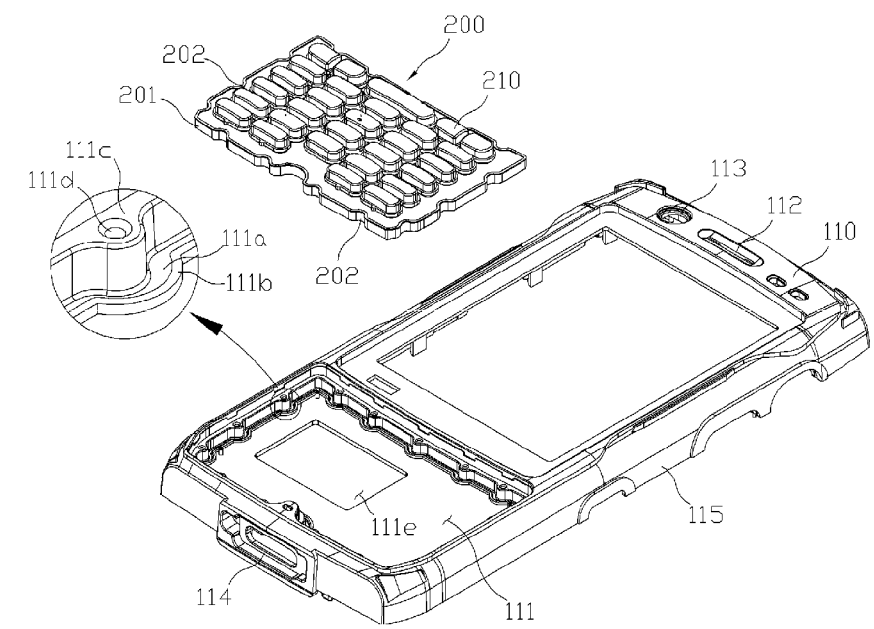
FIG. 6 is an enlarged exploded perspective view of a keypad and a front case.
Figure 7:
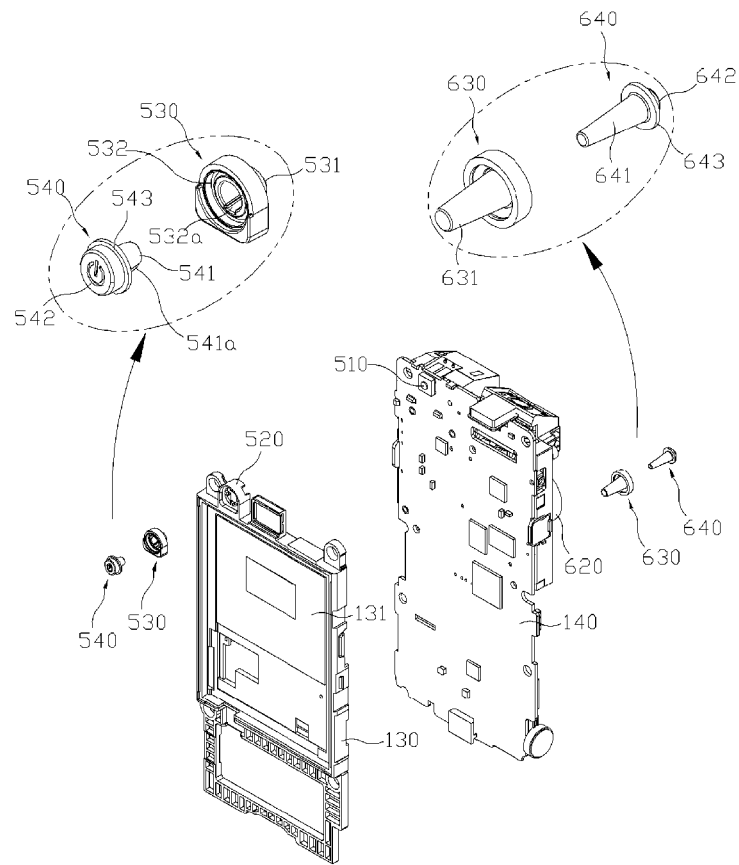
FIG. 7 is a partial exploded perspective view of a power key unit and a reset key unit.
Figure 8:
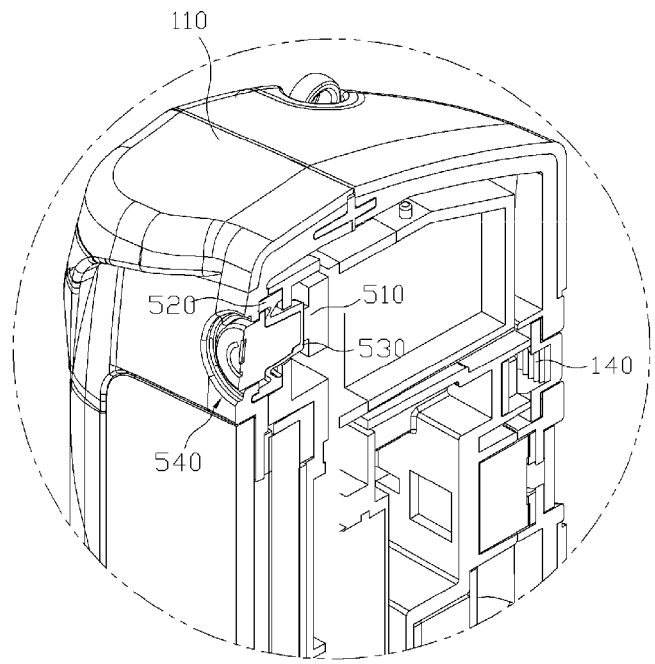
FIG. 8 is a cut-open perspective view of a power key area.
Figure 9:
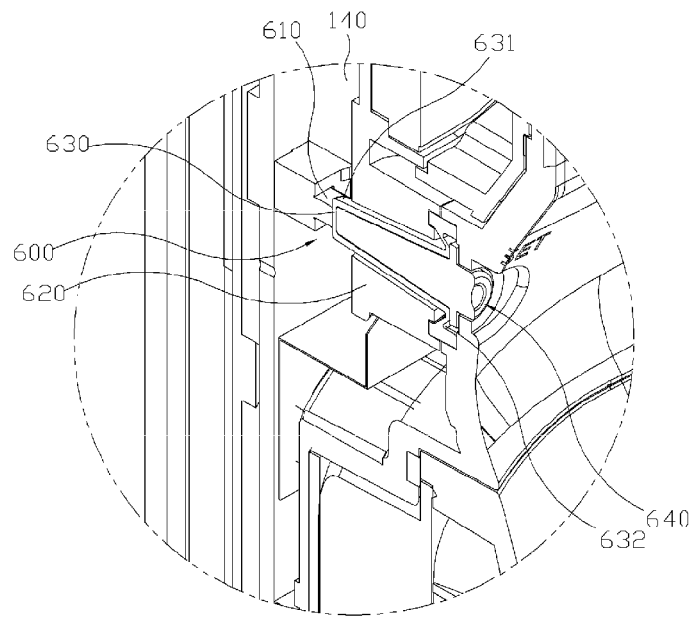
FIG. 9 is a cut-open perspective view of a reset key area.
Figure 10:
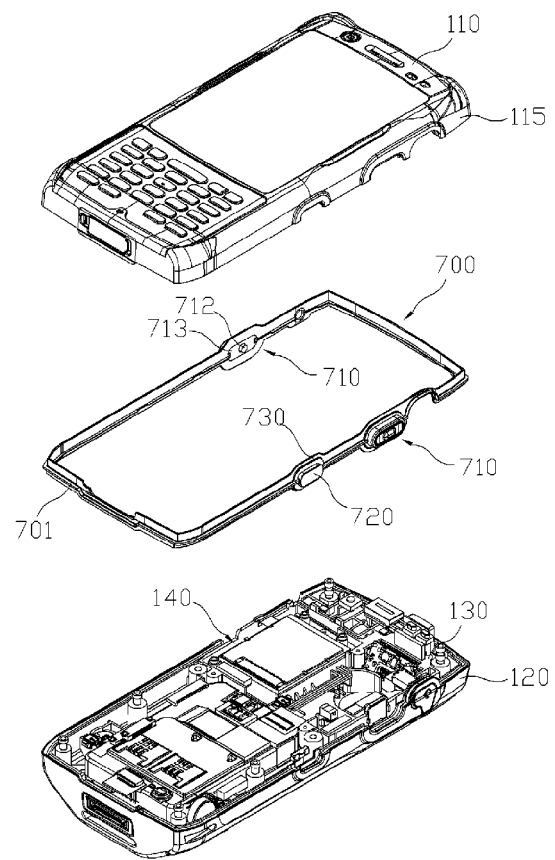
FIG. 10 is an exploded perspective view of a front case, a water-resistant rubber, and a rear case.
Figure 11:
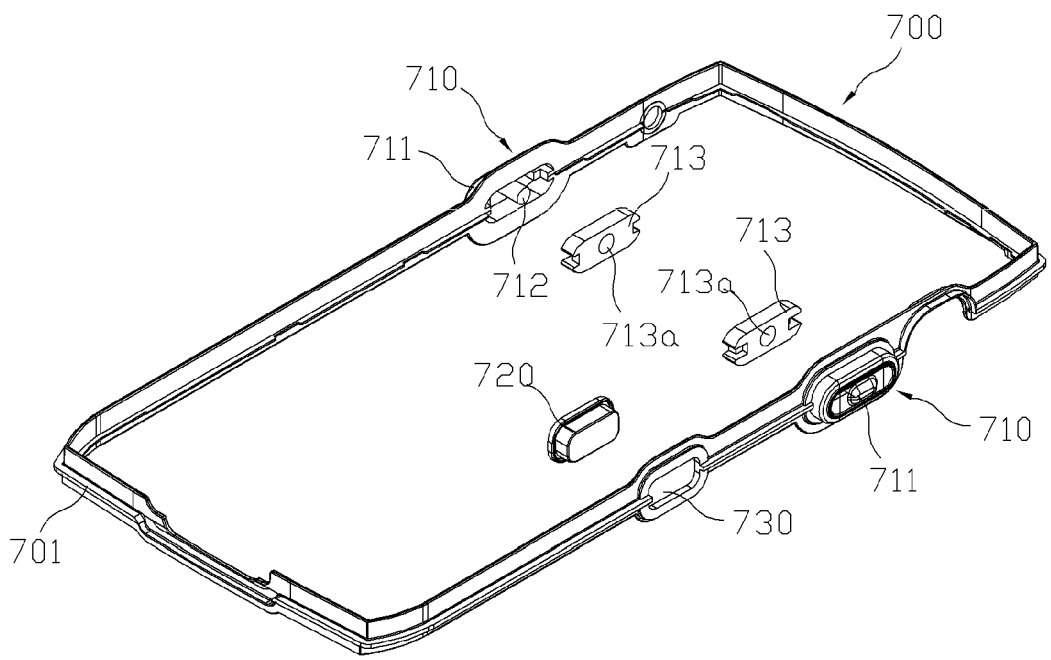
FIG. 11 is an exploded perspective view of the water-resistant rubber.

FIG. 1 is a perspective view of a mobile terminal according to an exemplary embodiment of the present inventive concept, FIG. 2 is an exploded perspective view of the mobile terminal of FIG. 1, FIG. 3 shows FIG. 1 at a different angle, FIG. 4 is an exploded perspective view of a touch screen area, FIG. 5 is an exploded perspective view of a key pad area, FIG. 6 is an enlarged exploded perspective view of a keypad and a front case, FIG. 7 is a partial exploded perspective view of a power key unit and a reset key unit, FIG. 8 is a cut-open perspective view of a power key area, FIG. 9 is a cut-open perspective view of a reset key area, FIG. 10 is an exploded perspective view of a front case, a water-resistant rubber, and a rear case, and FIG. 11 is an exploded perspective view of the water-resistant rubber.

Among these drawings, referring mainly to FIGS. 1 and 3, the mobile terminal in this exemplary embodiment includes a front case 110 having a keypad-accommodating portion 111, a rear case 120 detachably coupled to the front case 110 at a rear surface of the front case 110, an intermediate case 130 arranged between the front and rear cases 110 and 120 and assembled together with the front and rear cases 110 and 120, and a barcode reader module 135.

Further, the mobile terminal in this exemplary embodiment includes a flexible keypad 200 provided with a plurality of key buttons 210 and accommodated in the keypad-accommodating portion 111 of the front case 110, and a touch screen 300 provided in the front case 110 adjacent to the keypad 200.

The front case 110 is made by injection molding to form a front surface of the mobile terminal. The front case 110 is provided with a receiving hole 112, a power-key exposing hole 113, a terminal hole 114, etc. as well as the keypad-accommodating portion 111. Further, the front case 110 is, as shown in FIG. 1, formed with a place where a barcode button 116, a telephonic-communication speaker 117, a power light emitting diode (LED) 118a, a communication LED 118b, etc. are mounted.

Further, a decorative case 115 is additionally coupled to the front surface of the front case 110 so as to protect the front case 110 and have a decorative effect. Of course, the decorative case 115 is optional and not indispensable. The decorative case 115 may undergo plating or coating unlike the front case 110.

Figure 12:
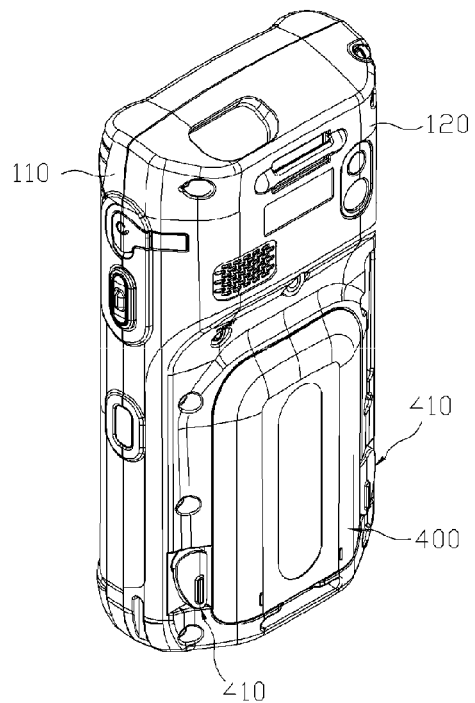
FIG. 12 is a rear perspective view of a mobile terminal to which a battery module is coupled.
Figure 13:
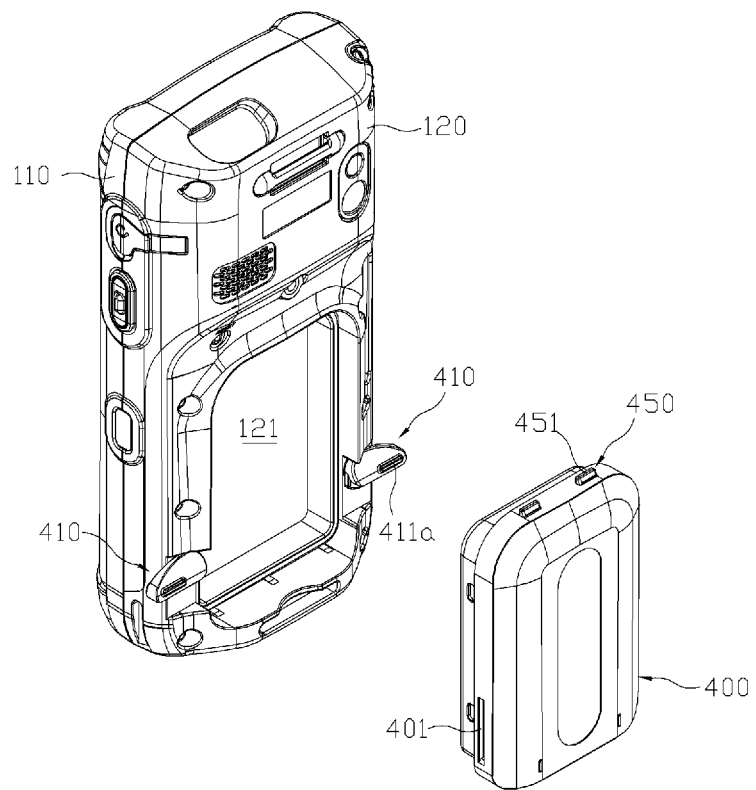
FIG. 13 is a rear perspective view of a mobile terminal from which the battery module is separated.

The rear case 120 is detachably coupled to the front case 110 at the rear surface of the front case 110. A bolt is used in coupling the rear case 120 with the front case 110. The rear case 120 is also made by the injection molding. As shown in FIGS. 12 and 13, the rear case 120 is formed with a place where a flash 125, a camera 126, an information-recognition speaker 138, a reset key unit 600, etc. are mounted. A lower region of the rear case 120 is provided with a hand-strap fastening portion 128, and an upper region thereof is provided with a stylus-pen strap fastening portion 129.

The rear case 120 is formed with a battery-accommodating portion 121 recessed toward the front case 110. The battery-accommodating portion 121 detachably couples with a battery module 400. A locking and releasing structure where the battery module 400 is attached to and detached from the battery-accommodating portion 121 will be described later.

The rear case 120 is provided with a pen-accommodating portion 122 in which a touch pen 350 is accommodated, a reset-key exposing hole 123, etc. in addition to the battery-accommodating portion 121.

The intermediate case 130 made by the injection molding like the front and rear cases 110 and 120 is assembled together with the front and rear cases 110 and 120 between the front and rear cases 110 and 120.

The intermediate case 130 serves to not only support a main printed circuit board (PCB) 140 but also partially support the key pad 200 and a touch screen 300.

Thus, the mobile terminal 300 in this exemplary embodiment includes the intermediate case 130 to support the main PCB and partially support the keypad 200 and the touch screen 300, so that components can be firmly assembled and improved in durability.

As shown in FIGS. 1 and 2, the barcode reader module 135 is arranged in between the front case 110 and the rear case 120 and mounted to the main PCB 140. Specifically, the barcode reader module 135 in this exemplary embodiment is arranged in an upper region within a space limited by the rear case 120 and the main PCB 140, and mounted to the main PCB 140 by a separate bracket (not shown) so as to be electrically connected to the main PCB 140. One of commercialized products may be selected as the barcode reader module 135. The barcode reader module 135 emits light to a barcode to be recognized through a transparent window 136 (see FIG. 2) provided in the upper region of the rear case 120, and reads out the information of the barcode based on an electric signal generated depending on the intensity of the light. Thus, the transparent window 136 is made of a transparent material so that the light emitted by the barcode reader module 135 and the light reflected from a medium printed with the barcode can pass therethrough.

Meanwhile, the mounting position of the barcode reader module 135 may be varied depending on a forming position of the transparent window 136. Preferably, the transparent window 136 is formed at a position convenient for a user to be put to the barcode printed on goods or the like while s/he grips the mobile terminal with his/her hand. Under the condition that the mobile terminal in this exemplary embodiment is a bar-type mobile terminal, the transparent window 136 is provided on the upper region of the rear case 120, and portions 136a (see FIG. 2) of the rear case 120, adjacent to the transparent window 136, have an inclined plane shape so as to be stably put to the barcode printed on the goods or the like. However, the mounting position of the barcode reader module 135 and the forming position of the transparent window 136 are not limited to this exemplary embodiment and may vary properly.

Although it is not shown, the mobile terminal in this exemplary embodiment includes the information-recognition speaker 138 (refer to FIGS. 12 and 13) connected to the barcode reader module 135 and generating an operation signal for the barcode reader module 135.

The information-recognition speaker 138 is provided separately from the telephonic-communication speaker 117 (see FIG. 1) that generates sounds when talking on a phone, and may have a higher output than that of the telephonic communication speaker 117. When the barcode reader module 135 reads out the barcode printed on the goods or the like, the information-recognition speaker 138 generates a signaling sound for alerting a user to whether it succeeds in a reading operation. At this time, the signaling sound may be differently set up between when the reading operation is successful and when the reading operation is failed, or the signaling sound may be generated only when the reading operation is successful. The barcode reader module 135 may be operated by the barcode button 116 or a side key 710 as shown in FIG. 1.

Meanwhile, the mobile terminal in this exemplary embodiment has both the keypad 200 and the touch screen 300, so that operating convenience can be improved in terms of storage, maintenance, management, etc. for information as compared to conventional mobile terminals.

The keypad 200 and the touch screen 300 are exposed on the font surface of the front case 110 for the purpose of the operating convenience. First, the touch screen 300 will be described with reference to FIG. 4.

As shown in FIG. 4, the touch screen 300 includes an upper electrode 310 having a polyethylene terephthalate (PET) film with indium tin oxide (ITO), a lower electrode 320 having a glass substrate with ITO and a dot spacer formed toward the upper electrode 310, and a wiring (not shown) connecting the upper electrode 310 and the lower electrode 320 and electrically connected to the main PCB 140.

Also, the touch screen 300 in this exemplary embodiment includes tempered glass 330 coupled to the front surface of the front case 110, and a water-resistant tape 340 attached to the rear of the front case 110.

The tempered glass 330 is sealed after being coupled to the front surface of the front case 110, and the upper electrode 310 and the lower electrode 320 are partially accommodated and supported in an electrode-accommodating portion 131 formed on the surface of the intermediate case 130.

The touch screen 300 in this exemplary embodiment employs a resistive overlay touch screen. The resistive overlay touch screen may be classified into a 4-wire resistive overlay touch screen and a 5-wire resistive overlay touch screen. Any resistive overlay touch screen can be used, but the present exemplary embodiment describes the 4-wire resistive overlay touch screen by way of an example.

As described above, the touch screen 300 in this exemplary embodiment includes the upper electrode 310, the lower electrode 320 and the wiring (not shown), and has a structure that the dot spacer is formed on the lower electrode 320 and facing toward the upper electrode 310.

An operating principle is as follows. If voltage is applied to electrodes arranged in parallel with both sides of a transparent resistive film, electric potential is distributed between the electrodes. Since the resistance of the resistive film is uniform, the electric potential is linearly distributed and thus linear relation is seen between distance and the electric potential. The voltage is applied to the lower electrode 320, and voltage at a touched point is detected by the upper electrode 310 and converted into a digital value through an analog/digital (A/D) converter, thereby calculating a position on an X-axis. Also, the voltage is applied to the upper electrode 310, and the voltage is detected by the lower electrode 320 and converted into the digital value in the same manner, thereby calculating a position on a Y-axis. Then, coordinates of a point touched with a finger or the touch pen 350 can be finally determined.

In comparison, the 5-wire resistive overlay touch screen is as much excellent in reliability, durability and lifespan of a product as it is designed taking poor surroundings into account. Unlike the 4-wire resistive overlay touch screen, the 5-wire resistive overlay touch screen measures X and Y coordinates on a lower plate, and an upper plate serves as a sensor for measuring the voltage applied to the lower plate. If the touch screen is touched, it contacts the ITO applied to the inside of the upper plate. At this time, if the controller recognizes the contact on the ITO of the upper/lower plates, and applies a voltage for detecting the X coordinate to the ITO on the glass substrate, a potential difference is generated on the ITO of the lower plate. The ITO of the upper plate detects a potential value at a touched position and transmits it to the controller, and the controller converts the received potential value into a proper X coordinate. If the touch continues, the Y coordinate is obtained in the same manner. Such obtained X and Y coordinates are transmitted to a computer, the touched position is displayed on a screen.

Of course, the scope of the present inventive concept is not limited thereto, and alternatively the touch screen 300 in this exemplary embodiment may include a capacitive overlay touch screen, a surface acoustic touch screen, a tactile sensor touch screen, a piezoelectric touch screen, etc.

Next, the keypad 200 has an assembly structure as follows. Referring mainly to FIGS. 5 and 6, the keypad 200 in this exemplary embodiment is assembled at a corresponding position while having a structure of preventing water or moisture from entering a keypad area 200.

To this end, an edge portion of the keypad 200 is provided with a water-resistant blade 201 extending toward the keypad-accommodating portion 111. On the bottom of the keypad-accommodating portion 111 is formed a blade-insertion rail 111*a* in which the water-resistant blade 201 is partially inserted.

The water-resistant blade 201 is continuously formed along a circumferential direction of the keypad 200. Since the keypad 200 has an approximately rectangular shape, the water-resistant blade 201 also has a continuous rectangular shape approximately, but not quite.

To fit with the water-resistant blade 201, the blade-insertion rail 111*a* has a continuous closed-loop shape corresponding to the water-resistant blade 201.

The blade-insertion rail 111*a* may be directly recessed on the bottom of the keypad-accommodating portion 111. However, in this exemplary embodiment, the blade-insertion rail 111*a* is formed by an outer wall of the keypad-accommodating portion 111, and a protrusion rib 111*b* protruding from the bottom at a position spaced apart from the outer wall.

If the water-resistant blade 201 of the keypad 200 is inserted in the blade-insertion rail 111*a*, the water-resistant blade 201 made of flexible rubber is held between the outer wall and the protrusion rib 111*b* of the keypad-accommodating portion 111, i.e., closely contacts at a corresponding position, thereby performing a water-resistant function. Accordingly, even if water enters the keypad area, it is prevented that water enters a keypad PCB 250 provided inside the keypad 200 or the main PCB 140 coupled to the intermediate case 130 and makes a trouble with the PCBs 250 and 140.

To assemble a keypad cover 220, there is provided a plurality of protrusions 111c protruding from the outer wall of the keypad-accommodating portion 111 toward a center area of the keypad-accommodating portion 111.

Further, on the edge portion of the keypad 200, a groove 202 is formed to be arranged corresponding to and be fit with the protrusion 111c. The protrusion 111c is formed with a screw hole 111d on the surface thereof, and the protrusion 111c and the groove 202 are shaped like a waveform.

The keypad PCB 250 smaller than the keypad 200 is inserted in the keypad 200. The front case 110 formed with the keypad-accommodating portion 111 is formed with a through hole 111e through which a flexible printed circuit board (PCB) passes so that the main PCB 140 and the keypad PCB 250 can be electrically connected to each other. The size of the through hole 111e is such as not to pass the keypad PCB 250 therethrough.

The keypad cover 220 is coupled to the keypad-accommodating portion 111 in front of the keypad 200 so that the key buttons 210 can be exposed to the outside. The keypad cover 220 includes a keypad protective cover 230 placed on the keypad 200 and coupled to the keypad-accommodating portion 111, and a keypad decorative cover 240 coupled to the top of the keypad protective cover 230.

The keypad protective cover 230 is formed with a screw hole 230a corresponding to the screw hole 111d of the protrusion 111c formed on the outer wall of the keypad-accommodating portion 111. The keypad protective cover 230 is screw-coupled to the keypad-accommodating portion 111, and the keypad decorative cover 240 is fitted to the keypad protective cover 230. Both the keypad protective cover 230 and the keypad decorative cover 240 are formed with exposing holes 230b and 240a through which the key buttons 210 are exposed to the outside.

Meanwhile, in addition to the foregoing structure, the mobile terminal in this exemplary embodiment further includes a power key unit 500, a reset key unit 600 and a water-resistant rubber 700 as shown in FIGS. 7 to 11.

First, the power key unit 500 is coupled to one side of the main PCB 140 and turns on/off the operation of the main PCB 140. Like the keypad 200, the power key unit 500 is also assembled at a corresponding position while having the water-resistant function.

As shown in FIGS. 7 and 8, the power key unit 500 includes a power-key tact switch 510 provided at one side of the main PCB 140; a first switch shield 520 provided in the intermediate case 130 and passing the power-key tact switch 510 therethrough while supporting and surrounding the power-key tact switch 510; a flexible power-key water-resistant cap 530 inserted in the first switch shield 520, airtightly sealing the first switch shield 520, and having a first protrusion shielding end portion 531 adjacent to the power-key tact switch 510; and a power key 540 inserted in and coupled to the power-key water-resistant cap 530 and substantially pressing the power-key tact switch 510.

The power-key water-resistant cap 530 does not have to be freely rotated within the first switch shield 520 after being coupled to the first switch shield 520 since it is a component fastened to the first switch shield 520. To this end, the first switch shield 520 and the power-key water-resistant cap 530 are manufactured to have a non-circular section.

The power key 540 includes a first shaft 541 to be inserted in an insertion portion 532 of the power-key water-resistant cap 530, a first head 542 formed at an exposed end portion of the first shaft 541, and a first flange 543 provided between the first shaft 541 and the first head 542.

The first flange 543 is more expanded outward in a radial direction than the diameter of the first head 542, and serves to cover an entrance of the insertion portion 532 stepped from the outer wall of the power-key water-resistant cap 530 toward the first protrusion shielding end portion 531.

Also, the power key 540 has to be coupled to the power-key water-resistant cap 530 in consideration of its directionality, and therefore the first shaft 541 of the power key 540 is formed with a direction setting key block 541a and the insertion portion 532 of the power-key water-resistant cap 530 is formed with a key groove 532a to which the direction setting key block 541a is coupled. Of course, the positions of the key block 541a and the key groove 532a may be exchanged with each other.

With this structure of the power key unit 500, in which the power-key water-resistant cap 530 for the water-resistant function is primarily assembled in the first switch shield 520 and then the power key 540 is secondarily assembled in the power-key water-resistant cap 530 so that the power-key tact switch 510 can be turned on and off by pressing the power key 540, it is possible to prevent water or moisture from entering an area of the power key 540 while fully guaranteeing the reliability of operation.

Next, the reset key unit 600 is as follows. The reset key unit 600 is used as a means for initializing various memories input by a user in the industrial PDA, such as a menu, information, schedule, etc. into a default value. That is, because it is inconvenient to delete the memories from the industrial PDA one by one the reset key unit 600 is vary useful in deleting and initializing various unnecessary memories at a time and reentering the menu, information and schedule so as to be conveniently used. The reset key unit 600 is coupled to the other side of the main PCB 140 and also has the water-resistant function.

As shown in FIGS. 7 and 9, the reset key unit 600 includes a reset-key tact switch 610 provided at the other side of the main PCB 140; a second switch shield 620 provided in the main PCB 140 to surround the reset-key tact switch 610 and passing the reset-key tact switch 610 therethrough; a flexible reset-key water-resistant cap 630 inserted in the second switch shield 620, airtightly sealing the second switch shield 620, and having a second protrusion shielding end portion 631 adjacent to the reset-key tact switch 610; and a reset key 640 inserted in and coupled to the reset-key water-resistant cap 630 and substantially pressing the reset-key tact switch 610.

The reset key unit 600 is different in shape from the power key unit 500, but has an approximately similar assembly or water-resistant structure to the power key unit 500. That is, the second switch shield 620 and the reset-key water-resistant cap 630 of the reset key unit 600 are also manufactured to have a non-circular section and thus there is no relative rotation.

The reset key 640 includes a second shaft 641 to be inserted in an insertion portion 632 of the reset-key water-resistant cap 630, a second head 642 formed at an exposed end portion of the second shaft 641, and a second flange 643 provided between the second shaft 641 and the second head 642. The second flange 643 is more expanded outward in a radial direction than the diameter of the second head 642, and serves to cover an entrance of the insertion portion 632 stepped from the outer wall of the reset-key water-resistant cap 630 toward the second protrusion shielding end portion 631.

With this structure of the reset key unit 600, in which the reset-key water-resistant cap 630 for the water-resistant function is primarily assembled in the second switch shield 620 and then the reset key 640 is secondarily assembled in the reset-key water-resistant cap 630 so that the reset-key tact switch 610 can be turned on and off by pressing the power key 640, it is possible to prevent water or moisture from entering an area of the reset key 640 while fully guaranteeing the reliability of operation.

Next, the water-resistant rubber 700 is as follows. As shown in FIGS. 10 and 11, the water-resistant rubber 700 serves to airtightly seal up the front and rear cases 110 and 120.

Technology of inserting a gasket between the front and rear cases 110 and 120 is general, but the water-resistant rubber 700 in this exemplary embodiment has a structure integrated with side keys 710 while having the water-resistant function beyond the general structure of the gasket.

The side keys 710 are symmetrically provided in opposite sides of the water-resistant rubber 700 while forming a pair. When the front and rear cases 110 and 120 are assembled, the pair of side keys 710 are partially exposed to the outside of the front and rear cases 110 and 120.

The side key 710 includes a key protrusion 711 protruding from the outer surface of the water-resistant rubber 700, and a key rod 712 connected to the key protrusion 711, extended to the inside of the front and rear cases 110 and 120 and contacting the main PCB 140.

The side key 710 where the key protrusion 711 and the key rod 712 are formed as a single body is made of the same flexible material as the water-resistant rubber 700, for example, rubber or silicon.

The side key 710 further includes a plate member 713 to be coupled to the rear of the key protrusion 711 as being put on the key rod 712. The plate member 713 is formed with a through hole 713a to be put on the key rod 712. The plate member 713 may be manufactured by the injection molding.

Further, a display window coupling portion 730 to which a display window 720 is coupled is formed at one side of the water-resistant rubber 700 at a position spaced apart from the side key 710. Likewise, the display window coupling portion 730 is formed integrally when the water-resistant rubber 700 is manufactured.

Also, a boundary rib 701 additionally protrudes to form a boundary between the front and rear cases 110 and 120 on the inner and outer surfaces of the water-resistant rubber 700. When the front and rear cases 110 and 120 are assembled, they are met each other with respect to the boundary rib 701.

Thus, the water-resistant rubber 700 formed integrally with the side keys 710 is interposed between the front and rear cases 110 and 120, so that water or moisture can be prevented from entering an area between the front and rear cases 110 and 120 after the front and rear cases 110 and 120 are assembled. Further, there is no process loss of separately assembling the side keys 710.

Figure 14:
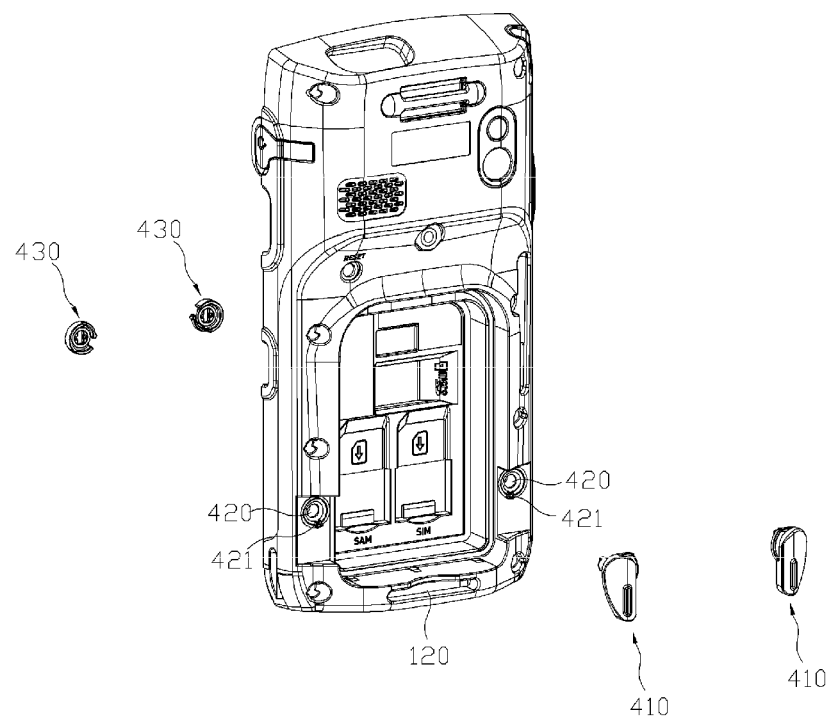
FIG. 14 is an exploded perspective view of a rear case, a rotation plate and a locker.
Figure 15:
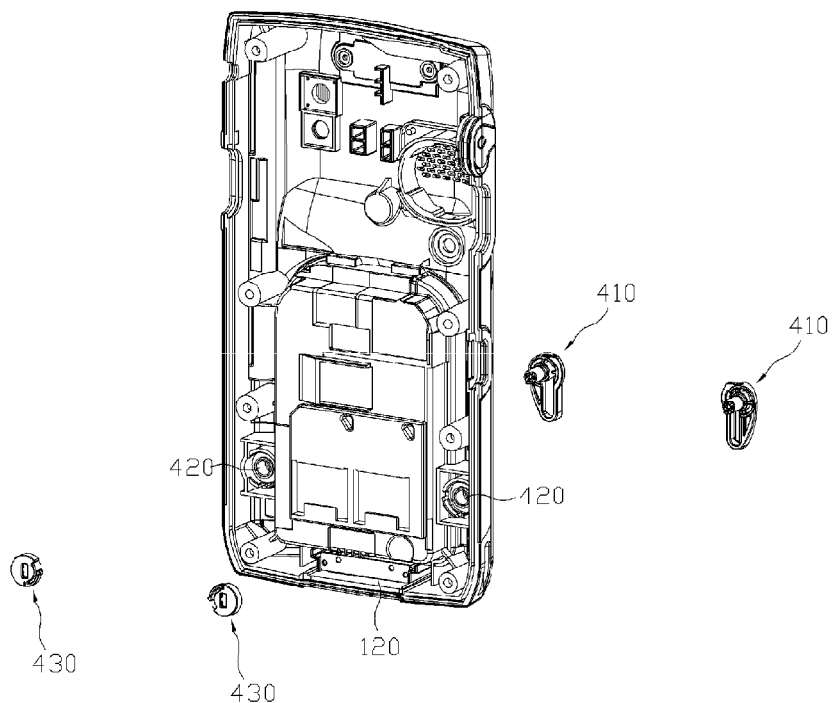
FIG. 15 shows FIG. 14 at a different angle.
Figure 16:
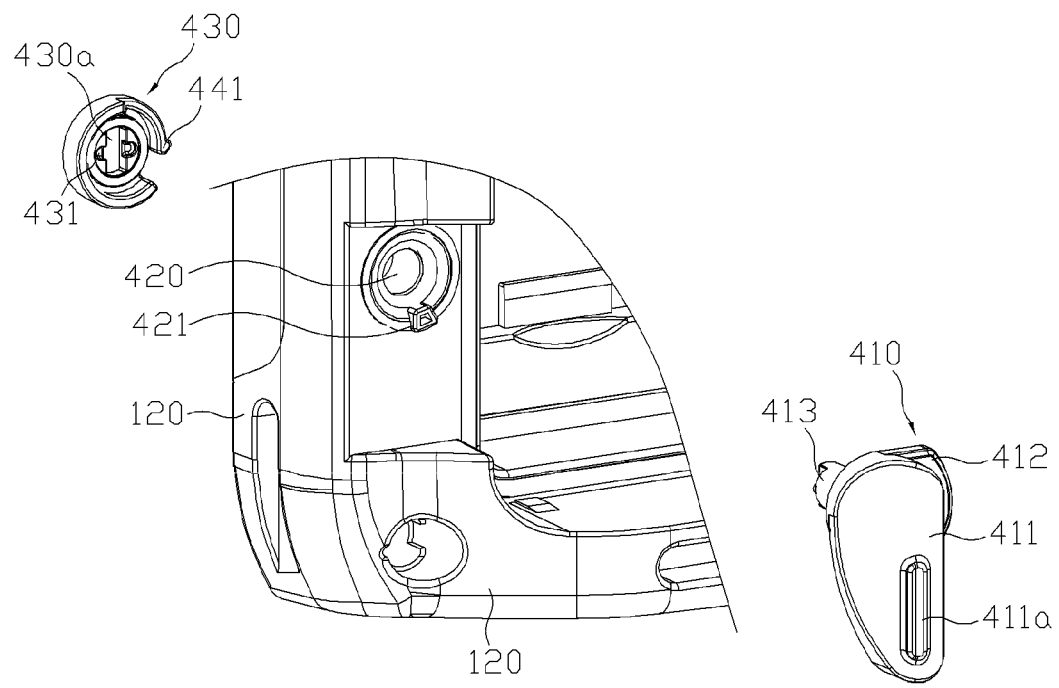
FIG. 16 is a partially enlarged view of FIG. 14.
Figure 17:
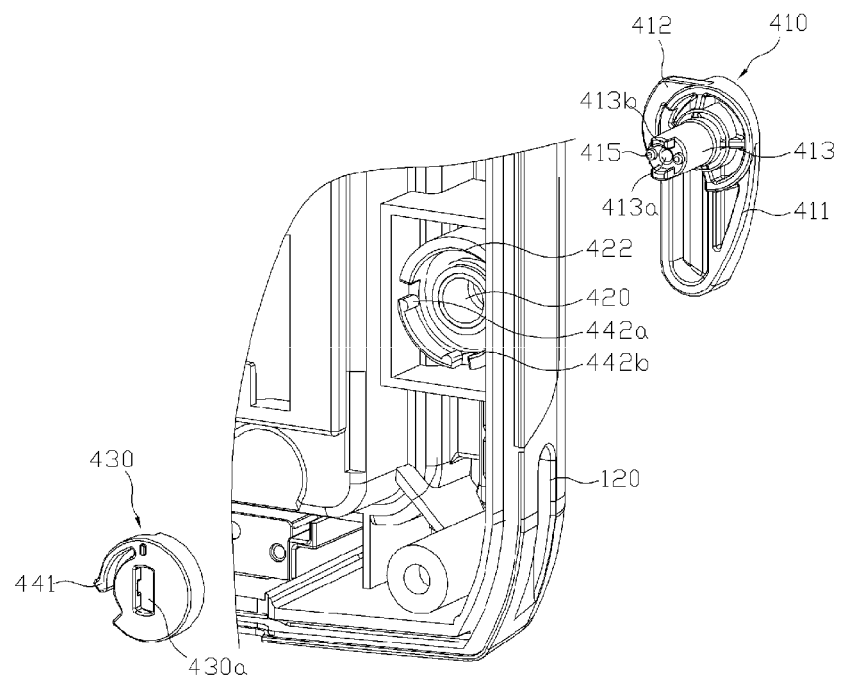
FIG. 17 is a partially enlarged view of FIG. 15.
Figure 18:
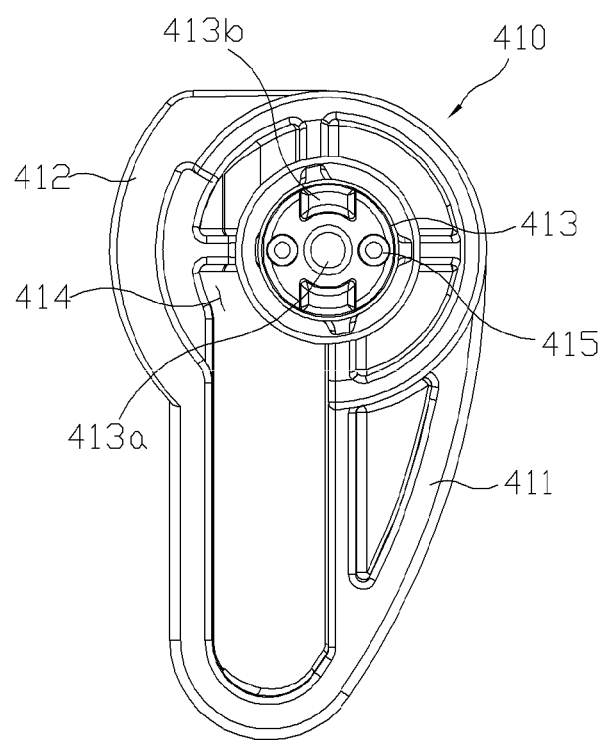
FIG. 18 is a rear view of the locker.
Figure 19:
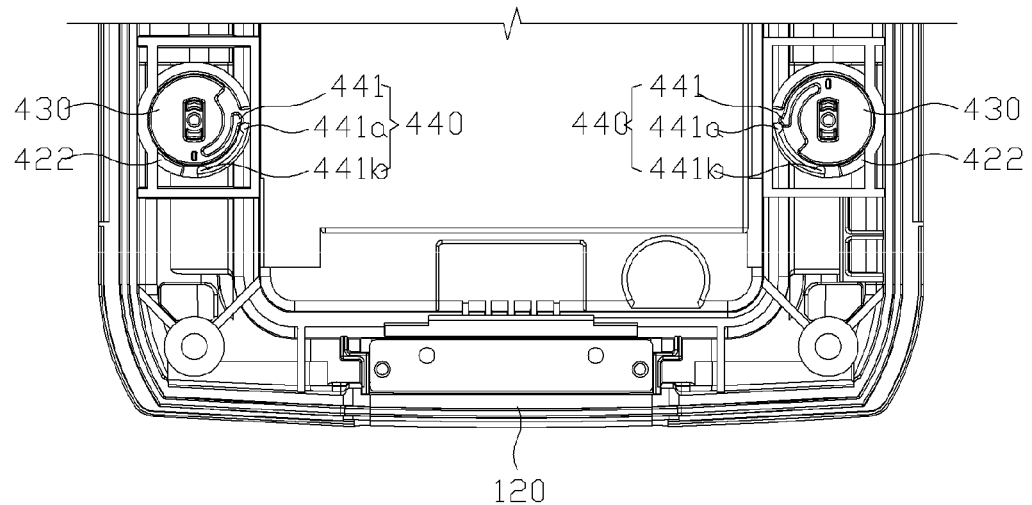
FIG. 19 is an operational view of a free-pivoting restrictor when the battery module is locked.
Figure 20:
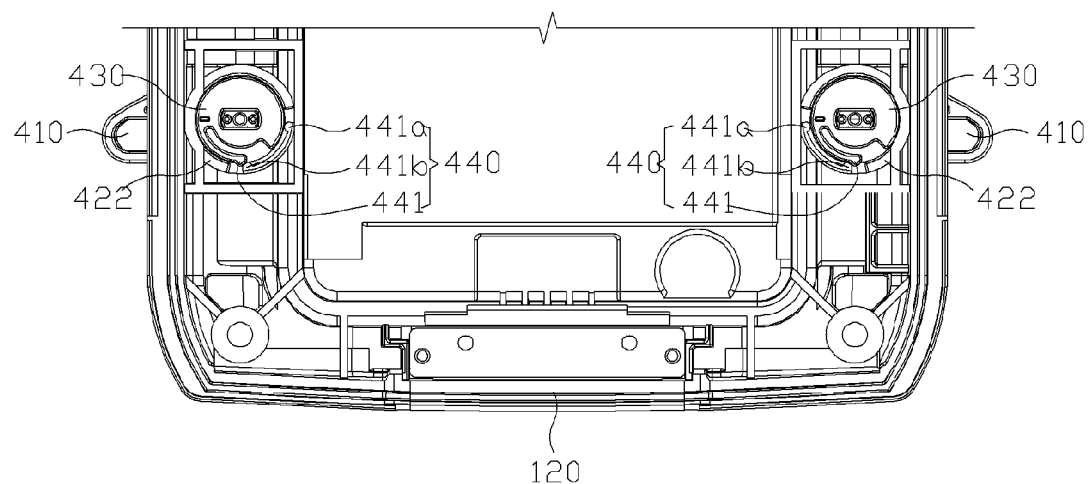
FIG. 20 is an operational view of the free-pivoting restrictor when the battery module is released.

FIG. 12 is a rear perspective view of a mobile terminal to which a battery module is coupled, FIG. 13 is a rear perspective view of a mobile terminal from which the battery module is separated, FIG. 14 is an exploded perspective view of a rear case, a rotation plate and a locker, FIG. 15 shows FIG. 14 at a different angle, FIG. 16 is a partially enlarged view of FIG. 14, FIG. 17 is a partially enlarged view of FIG. 15, FIG. 18 is a rear view of the locker, FIG. 19 is an operational view of a free-pivoting restrictor when the battery module is locked, and FIG. 20 is an operational view of the free-pivoting restrictor when the battery module is released.

The mobile terminal in this exemplary embodiment includes a battery module 400 to supply power to the main PCB 140, which has a structure capable of detachably coupling with a battery module more easily than a conventional one.

Referring to FIGS. 12 to 20, the mobile terminal in this exemplary embodiment includes lockers 410 rotatably coupled to the rear case 120 and making the battery module 400 to be locked to or released from the battery reception portion 121. In this exemplary embodiment, the lockers 410 form a pair and symmetrically provided in the rear case 120.

The locker 410 includes a body 411, a flange 412 protruding from one side of the body 411, and a shaft 413 connected to the body 411 and inserted in a locker coupling hole 420 of the rear case 120.

The body 411, the flange 412 and the shaft 413 may be made of one material and injection-molded as a single body. They may be made of metal or plastics. In the latter case, they may undergo a plating or coating process.

The body 411 has a convex surface from which a locker handling rib 411a further protrudes. The locker handling rib 411a may prevent a slip when the body 411 is handled.

While pivoting on the shaft 413, the flange 412 protruding from one side of the body 411 is inserted in a locking groove 401 of the battery module 400 when the body 411 is arranged in a lengthwise direction of the rear case 120 (refer to FIGS. 12 and 19), but separated from the locking groove 401 of the battery module 400 when the body 411 is arranged in a direction transverse to the lengthwise direction of the rear case 120 (refer to FIGS. 13 and 20).

Thus, the battery module 400 can be locked and released on the basis of the operations that the flange 412 of the locker 410 is inserted in and separated from the locking groove 401 of the battery module 400 while pivoting. In this case, if the flange 412, i.e., the locker 410 pivots 360 degrees, it may be inconvenient to lock the battery module 400.

In other words, there is a need of restricting a pivoting angle of the locker 410 in order to more conveniently lock and release the battery module 400.

To this end, a pivoting groove 414 is formed in one of the rear case 120 formed with the locker coupling hole 420 and the body 411 of the locker 410, and a pivoting angle restricting projection 421 for restricting the pivoting angle of the pivoting groove 414 is formed in the other one.

In this exemplary embodiment, the pivoting groove 414 is provided in the body 411 of the locker 410, and the pivoting angle restricting projection 421 is provided in the rear case 120, but not limited thereto. Alternatively, the positions of the pivoting groove and the pivoting angle restricting projection may be exchanged with each other.

As shown in FIG. 18, the pivoting groove 414 formed in the body 411 of the locker 410 is provided on the rear of the body 411 in the form of an arc. As shown in FIG. 6, the pivoting angle restricting projection 421 is provided protruding from the surface of the rear case 120 formed with the locker coupling hole 420. Thus, if the locker 410 pivots, the pivoting angle restricting projection 421 is caught in opposite ends of the pivoting groove 414 while moving along a path in the pivoting groove 414, thereby restricting the pivoting angle of the locker 410.

As shown in FIGS. 14 to 17, the mobile terminal in this exemplary embodiment further includes a pivoting plate 430 coupled to the shaft 413 of the locker 410 by a bolt from the rear of the rear case 120 and pivoting along with the locker 410.

To couple the pivoting plate 430 taking directionality into account, one of the shaft 413 and the pivoting plate 430 is provided with a plurality of coupling projections 415, and the other one is formed with a projection insertion groove 431 in which the coupling projections 415 are partially inserted.

In this exemplary embodiment, the plurality of coupling projections 415 is provided in the shaft 413, and the projection insertion groove 431 is provided in the pivoting plate 430, but not limited thereto. Alternatively, the positions of the coupling projections and the projection insertion groove may be exchanged with each other.

The shaft 413 and the pivoting plate 430 are formed with holes 413a and 430a to be fastened with a bolt. The hole 430a formed in the pivoting plate 430 has an approximately rectangular shape, and a pair of protrusion guides 413b formed in the shaft 413 is inserted in opposite inner sides of the hole 430a of the pivoting plate 430.

Meanwhile, the rear of the rear case 120 formed with the locker coupling hole 420 is further formed with a pivoting plate inserting boss 422 in which the pivoting plate 420 is inserted.

Further, a free-pivoting restrictor 440 for restricting free-pivoting of the locker 410 is provided in the pivoting plate 430 and the pivoting plate inserting boss 422.

Here, the free-pivoting refers to a case that the locker 410 freely pivots even though the battery module 400 is locked as shown in FIGS. 12 and 19, and a case that the position of the locker 410 is arbitrarily varied when the battery module 400 is released as shown in FIGS. 13 and 20.

Although the free-pivoting restrictor 440 has weak force to restrict the pivoting of the locker 410, it is very effective in that the locker 410 is not freely pivoted by vibration or external shock.

The free-pivoting restrictor 440 includes a stopper 441 formed on the pivoting plate 430, and protrusions 442a and 442b inserted in the pivoting plate inserting boss 422 and catching the stopper 441. Alternatively, the positions of the stopper 441 and the protrusions 442a and 442b may be exchanged with each other. The outer surfaces of the stopper 441 and the protrusions 442a and 442b are rounded.

As shown therein, the stopper 441 formed on the pivoting plate 430 is provided as a free end in the pivoting plate 430 so as to be elastically movable inward or outward in a radial direction. To form the stopper 441, the pivoting plate 430 has a cut-open form at one side thereof.

Although one stopper 441 is provided, the protrusions 442a and 443b are provided in the pivoting plate inserting boss 422 while forming a pair at different positions along a circumferential direction of the pivoting plate 430. If the stopper 441 is caught in a first protrusion 442a, the locker 410 is urged not to freely pivot at a locking position of the locker 410. If the stopper 441 is caught in a second protrusion 442b, the locker is urged not to freely pivot at a releasing position of the locker 410.

Meanwhile, the battery module 400 and the battery reception portion 121 are provided with a primary coupling portion 450 for primarily coupling the battery module 400 and the battery reception portion 121 before the operation of the locker 410.

The primary coupling portion 450 includes a primary coupling projection 451 provided at a lateral side of the battery module 400, and a primary coupling groove (not shown) provided in an inner wall of the battery reception portion 121. Thus, a user inserts the primary coupling projection 451 of the battery module 400 into the primary coupling groove of the battery reception portion 121, and then pivots the locker 410, thereby completely locking the battery module 400.

As above, according to the exemplary embodiments of the present inventive concept, the mobile terminal has both the keypad 200 and the touch screen 300, so that operating convenience is improved in terms of storage, maintenance, management, etc. for information as compared to conventional mobile terminals.

Although a few exemplary embodiments have been shown and described, it will be appreciated that the scope of the present inventive concept is not limited to the foregoing exemplary embodiments.

For example, the touch screen according to the foregoing exemplary embodiment employs the resistive overlay touch screen, but not limited thereto. Alternatively, the touch screen according to the present inventive concept may employ the capacitive overlay touch screen.

Further, the foregoing exemplary embodiment discloses the barcode reader module. However, the mobile terminal according to the present inventive concept may further include an radio frequency identification (RFID) reader module in addition to the barcode reader module.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

The present inventive concept can be applied to an industrial mobile terminal.

The invention claimed is:

1. A mobile terminal comprising:
a front case having a keypad-accommodating portion;
a rear case detachably coupled to the front case at a rear surface of the front case;
a main printed circuit board (PCB) interposed between the front case and the rear case;
a keypad having a plurality of key buttons, accommodated in the keypad-accommodating portion of the front case;
a touch screen arranged on the front case in the vicinity of the keypad; and
a keypad PCB which is smaller than the keypad and is inserted in the keypad,
wherein the front case formed with the keypad-accommodating portion is formed with a through hole through which a flexible printed circuit board (PCB) passes so that the main PCB and the keypad PCB can be electrically connected to each other.

2. The mobile terminal according to claim 1, wherein the touch screen comprises a resistive overlay touch screen.

3. The mobile terminal according to claim 2, wherein the touch screen comprises:
an upper electrode comprising a polyethylene terephthalate (PET) film with indium tin oxide (ITO);
a lower electrode comprising a glass substrate with ITO and a dot spacer formed toward the upper electrode; and
a wiring connecting the upper electrode and the lower electrode and electrically connected to the main PCB.

4. The mobile terminal according to claim 3, wherein the upper electrode and the lower electrode are partially accommodated and supported in an electrode-accommodating portion formed on a surface of an intermediate case interposed between the front case and the rear case, and
the touch screen comprises
tempered glass coupled to the front surface of the front case; and
a water-resistant tape attached to the rear of the front case.

5. The mobile terminal according to claim 1, wherein an edge portion of the keypad is provided with a water-resistant blade extending toward the keypad-accommodating portion, and on a bottom of the keypad-accommodating portion is formed a blade-insertion rail in which the water-resistant blade is partially inserted.

6. The mobile terminal according to claim 5, wherein the blade-insertion rail is formed by an outer wall of the keypad-accommodating portion and a protrusion rib protruding from the bottom at a position spaced apart from the outer wall.

7. The mobile terminal according to claim 5, wherein a plurality of protrusions protrudes from the outer wall of the keypad-accommodating portion toward a center area of the keypad-accommodating portion, and on the edge portion of the keypad is formed a groove to be arranged corresponding to and be fit with the protrusion.

8. The mobile terminal according to claim 5, further comprising a keypad cover coupled to the keypad-accommodating portion in front of the keypad so that the key buttons can be exposed to the outside,
wherein the keypad cover comprises
a keypad protective cover placed on the keypad and coupled to the keypad-accommodating portion; and
a keypad decorative cover coupled to the top of the keypad protective cover.

9. The mobile terminal according to claim 1, further comprising:
a power key unit coupled to one side of the main PCB and turning on/off the operation of the main PCB; and
a reset key unit coupled to the other side of the main PCB and initializing a memory.

10. The mobile terminal according to claim 9, wherein the power key unit comprises
a power-key tact switch provided at one side of the main PCB;
a first switch shield provided in an intermediate case interposed between the front case and the rear case and passing the power-key tact switch therethrough while supporting and surrounding the power-key tact switch;
a flexible power-key water-resistant cap inserted in the first switch shield, airtightly sealing the first switch shield, and having a first protrusion shielding end portion adjacent to the power-key tact switch; and
a power key inserted in and coupled to the power-key water-resistant cap and substantially pressing the power-key tact switch.

11. The mobile terminal according to claim 10, wherein the power key comprises
a first shaft to be inserted in an insertion portion of the power-key water-resistant cap;
a first head formed at an exposed end portion of the first shaft; and
a first flange provided between the first shaft and the first head, more expanded outward in a radial direction than the diameter of the first head, and serving to cover an entrance of the insertion portion stepped from the outer wall of the power-key water-resistant cap toward the first protrusion shielding end portion.

12. The mobile terminal according to claim 11, wherein one of the first shaft and the insertion portion is formed with a direction setting key block, and the other one is formed with a key groove to which the direction setting key block is coupled.

13. The mobile terminal according to claim 9, wherein the reset key unit comprises
a reset-key tact switch provided at the other side of the main PCB;
a second switch shield provided in the main PCB to surround the reset-key tact switch and passing the reset-key tact switch therethrough;
a flexible reset-key water-resistant cap inserted in the second switch shield, airtightly sealing the second switch shield, and having a second protrusion shielding end portion adjacent to the reset-key tact switch; and
a reset key inserted in and coupled to the reset-key water-resistant cap and substantially pressing the reset-key tact switch.

14. The mobile terminal according to claim 13, wherein the reset key comprises:
a second shaft to be inserted in an insertion portion of the reset-key water-resistant cap;
a second head formed at an exposed end portion of the second shaft; and
a second flange provided between the second shaft and the second head, more expanded outward in a radial direction than the diameter of the second head, and serving to cover an entrance of the insertion portion stepped from the outer wall of the reset-key water-resistant cap toward the second protrusion shielding end portion.

15. The mobile terminal according to claim 1, further comprising: a water-resistant rubber airtightly sealing up the front and rear cases between the front and rear cases, and integrated with side keys.

16. The mobile terminal according to claim 15, wherein the side keys are symmetrically provided in opposite sides of the water-resistant rubber while forming a pair, and the pair of side keys are partially exposed to the outside of the front and rear cases when the front and rear cases are assembled,
the side key comprising:
a key protrusion protruding from the outer surface of the water-resistant rubber; and
a key rod connected to the key protrusion, extended to the inside of the front and rear cases and contacting the main PCB, and
the side key being made of the same material as the water-resistant rubber.

17. The mobile terminal according to claim 16, wherein the side key further comprises a plate member to be coupled to the rear of the key protrusion as being put on the key rod.

18. The mobile terminal according to claim 15, further comprising
a display window coupling portion, to which a display window is coupled, being formed at one side of the water-resistant rubber; and
a boundary rib additionally protruding to form a boundary between the front and rear cases on the inner and outer surfaces of the water-resistant rubber.

19. The mobile terminal according to claim 1, wherein a barcode reader module is coupled to at least one of the front case and the rear case and mounted to the main PCB.

20. The mobile terminal according to claim 19, further comprising an information-recognition speaker connected to the barcode reader module and generating an operation signal for the barcode reader module.

21. The mobile terminal according to claim 1, wherein the mobile terminal comprises an industrial personal digital assistant.

* * * * *